Patented June 19, 1934

1,963,598

UNITED STATES PATENT OFFICE 1,963,598

MANUFACTURE OF 5-NITRO-2-AMINO-ANISOLE

John M. Tinker and Louis Spiegler, South Milwaukee, Wis., assignors to E. I. du Pont de Nemours & Company, Wilmington, Del., a corporation of Delaware No Drawing. Application January 25, 1932, Serial No. 588,816

10 Claims. (Cl. 260—124)

This invention relates to the manufacture of 5-nitro-2-anisidine. It is an object of this invention to provide a process for the manufacture of 5-nitro-2-anisidine whereby the same is obtained in good yield and in great predominance over the 4-nitro isomer. A further object of this invention is to provide a simple and efficient process for the manufacture of 5-nitro-2-anisidine by using the requisite initial materials in economical quantities. Other and further important objects of this invention will appear as the description proceeds.

By 5-nitro-2-anisidine and 4-nitro-2-anisidine, we are referring respectively to the following two compounds:

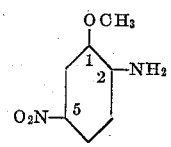  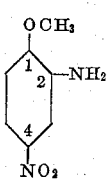

5-nitro-2-anisidine    4-nitro-2-anisidine the orientation of the substituents being taken with respect to the OCH₃ group. These compounds may also be designated respectively as 5-nitro-2-amino-1-anisole and 4-nitro-2-amino-1-anisole.

5-nitro-2-amino-1-anisole has been prepared in the art by reacting upon acetaniside (2-acetyl-amino-1-anisole) with an excess of nitric acid, either in the presence or absence of acetic acid. (German Patent No. 98,637; Friedlander, V, 67). This process produces a mixture of the 5-nitro and 4-nitro isomers, the ratio of the two depending on the particular conditions of nitration. A more serious objection, however, is the fact that this process requires prohibitive and wasteful excesses of nitric acid, thus rendering the process impractical for commercial purposes. To remedy this objection an attempt was made in the art to use concentrated sulfuric acid as solvent for the nitration mass. It was found, however, that this process leads almost exclusively to the formation of the 4-nitro isomer. (Georges Freyss, Bull. Soc. Ind., Mulhouse, 70, 375-383; Chemisches Centralblatt, 1901, I, 739.)

We have now made the surprising discovery that if instead of concentrated sulfuric acid, dilute sulfuric acid is used, the reaction proceeds smoothly toward the production of a mixture of nitro-anisidines in which the 5-nitro isomer predominates. More particularly, we found that if acetyl-o-anisidine is treated with 1 to 3 mols of nitric acid in a medium of sulfuric acid of less strength than 60° Bé., a product results containing a mixture of 5-nitro-2-anisidine and 4-nitro-2-anisidine in a ratio varying with the specific conditions of nitration, but being generally in the neighborhood of 2:1.

Based on this discovery, our novel process consists of treating acetyl-o-anisidine with nitric acid in a medium of sulfuric acid of less strength than 60° Bé. but of sufficient concentration to keep the entire mass in solution during the nitration. In its more preferred form, our process consists of reacting upon acetyl-o-anisidine with about 1 to 3 molal ratios of nitric acid in the presence of aqueous sulfuric acid of 55 to 78% strength. The reaction mass is then drowned in water to precipitate a mixture of 5-nitro-2-acetylamino-anisole and related nitro bodies. The precipitate is then filtered off, treated with caustic alkali to hydrolyze the acetylamino group, the resulting mixture of nitro-anisidines is again filtered off and heated in sulfuric acid of about 3 to 8% strength to convert the mixture of amines into the corresponding sulfates. Upon cooling and diluting the sulfate of 5-nitro-2-anisidine precipitates, while the sulfates of the 4-isomer and other nitration products stay in solution. Filtration of the latter mass finally gives 5-nitro-2-anisidine sulfate substantially free from isomers.

Other concentrations of sulfuric acid may be used in the nitration step, but are not advantageous. The use of sulfuric acid of a strength below 55% decreases the speed of nitration, unless excessive quantities of either nitric or sulfuric acid be used. Also, the reaction mass under such low concentration of H₂SO₄ tends to crystallize out. The use of concentrated sulfuric acid above 78% (60° Bé.) decreases the ratio of the 5-nitro isomer in the product.

For best results, the concentration of sulfuric acid should be gradually built up, as the reaction proceeds, from a value near the lower concentration limit above stated to one near the higher limit. The object of this is to bring back into solution any of the acetylamino anisole which may have precipitated out during the reaction, while at the same time avoiding excesses of sulfuric acid beyond the minimum concentration required for complete solution of the reaction mass, especially during the initial stages of the reaction.

The quantity of nitric acid used may vary from about one to three moles for each mole of acetylo-anisidine. The yield generally increases with the larger quantities of nitric acid.

For best results, the temperature of the reaction mass should be kept between 18 and 25° C., although some variation outside these limits is permissible. Below 15° C., however, the reaction proceeds at a very slow rate, and contains further the danger of starting suddenly at an uncontrollable rate. Again, above 30° C., the nitration proceeds too fast for proper control, and results in a decreased yield of the desired product.

Without limiting our invention to any particular procedure, the following example is given to illustrate our preferred mode of operation. Parts given are parts by weight.

*Example*

565 parts of 63% nitric acid, 790 parts of 60° Bé. sulfuric acid and 60 parts of water are charged into an enameled vessel. 440 parts of N-acetyl-o-anisidine (prepared from 320 parts of o-anisidine) and 1950 parts of 60° Bé. sulfuric acid are added alternately in small portions, while maintaining the temperature at 20–25° C. The addition of said two compounds is preferably carried out in the following manner: At first the acetyl body is added in small quantities until nitro-2-acetylamino-anisole starts to crystallize out. Sulfuric acid is then added until the mass is reconverted into a clear solution. The procedure is then repeated until the entire quantities of acetyl-o-anisidine and sulfuric acid above specified have been introduced. The mass is now stirred for 1 hour at about 25° C., poured into a mixture of water and ice, and filtered. The filter cake is washed acid-free and then suspended in 855 parts of denatured alcohol and heated to 70° C. 112 parts of caustic soda, dissolved in water to a 70% solution, are added gradually over a period of three hours, while maintaining the mass at 70–75° C., to hydrolyze off the acetyl group. The mass is now diluted with water to a total of about 2500 parts, cooled to 15° C., and filtered. The filter cake consists of a mixture of nitro-o-anisidines, and melts at 114–119° C. Analysis shows it to consist substantially of 5- and 4-nitro-o-anisidines in the ratio of about 2:1, respectively.

From this mixture the bulk of 5-nitro-2-amino-anisole may be recovered substantially free of isomers by dissolving the entire mass in 3200 parts of hot, 5% sulfuric acid, and then cooling to about 15° C., whereby the sulfate of 5-nitro-2-anisidine precipitates. The mass is then filtered and washed with dilute sulfuric acid. On basing with caustic soda and drying, it melts at 140–141.5° C.

From the mother liquors the 4-nitro-isomer may be recovered in any suitable manner.

If desired the first filtration step, namely the filtration of the mixture of nitro-acetylamino-anisoles may be dispensed with. Instead, the drowned reaction mass may be boiled directly to split off the acetyl group, and then cooled to precipitate 5-nitro-2-amino-anisole in the form of its sulfate, which may be then filtered off and washed as above.

Many variations and modifications are possible in our preferred procedure, without departing from the spirit of this invention, as will be readily understood to those skilled in the art.

We claim:

1. A process for preparing 5-nitro-2-amino-anisole which comprises the step of reacting upon N-acetyl-o-anisidine with nitric acid in a medium of sulfuric acid of less strength than 60° Bé.

2. A process for preparing 5-nitro-2-amino-anisole which comprises the step of reacting upon N-acetyl-o-anisidine with nitric acid in a medium of sulfuric acid of 55 to 78% strength.

3. A process for preparing 5-nitro-2-acetylamino-anisole which comprises reacting upon N-acetyl-o-anisidine with 1 to 3 molal ratios of nitric acid in a medium of aqueous sulfuric acid of 55 to 78% strength and at a temperature between 15 and 30° C.

4. A process for preparing 5-nitro-2-acetylamino-anisole which comprises reacting upon N-acetyl-o-anisidine with 1 to 3 molal ratios of nitric acid in a medium of aqueous sulfuric acid of 55 to 78% strength, at a temperature between 18 and 25° C., diluting the reaction mass, and recovering a mixture of nitro-acetylamino-anisoles.

5. A process for preparing 5-nitro-2-acetylamino-anisole which comprises reacting upon N-acetyl-o-anisidine with 1 to 3 molal ratios of nitric acid in a medium of aqueous sulfuric acid increasing in concentration, as the reaction proceeds, from about 55 to about 78% strength, diluting the reaction mass, and recovering the precipitated nitro-acetylamino-anisole.

6. A process for preparing 5-nitro-2-amino-anisole which comprises reacting upon N-acetyl-o-anisidine with 1 to 3 molal ratios of nitric acid in a medium of aqueous sulfuric acid of 55 to 78% strength, diluting the reaction mass, hydrolyzing off the acetyl group, and recovering 5-nitro-2-amino-anisole in the form of its sulfate.

7. A process for preparing 5-nitro-2-amino-anisole which comprises reacting upon N-acetyl-o-anisidine with 1 to 3 molal ratios of nitric acid, at a temperature between 18 and 25° C. and in a medium of aqueous sulfuric acid of 55 to 78% strength, diluting the reaction mass, recovering the precipitated mass of nitro-acetylamino-anisole, hydrolyzing off the acetyl group, and recovering 5-nitro-2-amino-anisole in the form of its sulfate.

8. A process for preparing 5-nitro-2-amino-anisole which comprises reacting upon N-acetyl-o-anisidine with 1 to 3 molal ratios of nitric acid in a medium of aqueous sulfuric acid of 55 to 78% strength, diluting the reaction mass, recovering the precipitated mass of nitro-acetylamino-anisole, hydrolyzing off the acetyl group, recovering 5-nitro-2-amino-anisole in the form of its sulfate, and treating the latter with aqueous alkali to form the free base.

9. In the process of preparing 5-nitro-2-amino-anisole by reacting upon o-acetylamino-anisole with aqueous nitric acid, the step of effecting the reaction in an aqueous sulfuric acid medium of a strength not substantially higher than the minimum required for keeping the entire reaction mass in solution under the particular working conditions.

10. In the process of preparing 5-nitro-2-anisidine by nitrating N-acetyl-o-anisidine, the improvement which comprises effecting the nitration in a sulfuric acid medium of 55 to 78% strength and at a temperature between 15 and 30° C.

JOHN M. TINKER.
LOUIS SPIEGLER.